Jan. 31, 1956        D. R. GERO        2,733,027
EJECTABLE AIRCRAFT SEAT CAPSULE

Filed Dec. 17, 1952        5 Sheets-Sheet 1

INVENTOR.
Doane R. Gero
BY
*ATTORNEY*

INVENTOR.
Doane R. Gero

Jan. 31, 1956     D. R. GERO     2,733,027
EJECTABLE AIRCRAFT SEAT CAPSULE

Filed Dec. 17, 1952     5 Sheets-Sheet 3

INVENTOR.
Doane R. Gero

BY

*H.H. Oedham*
ATTORNEY

Jan. 31, 1956  D. R. GERO  2,733,027
EJECTABLE AIRCRAFT SEAT CAPSULE
Filed Dec. 17, 1952  5 Sheets-Sheet 4
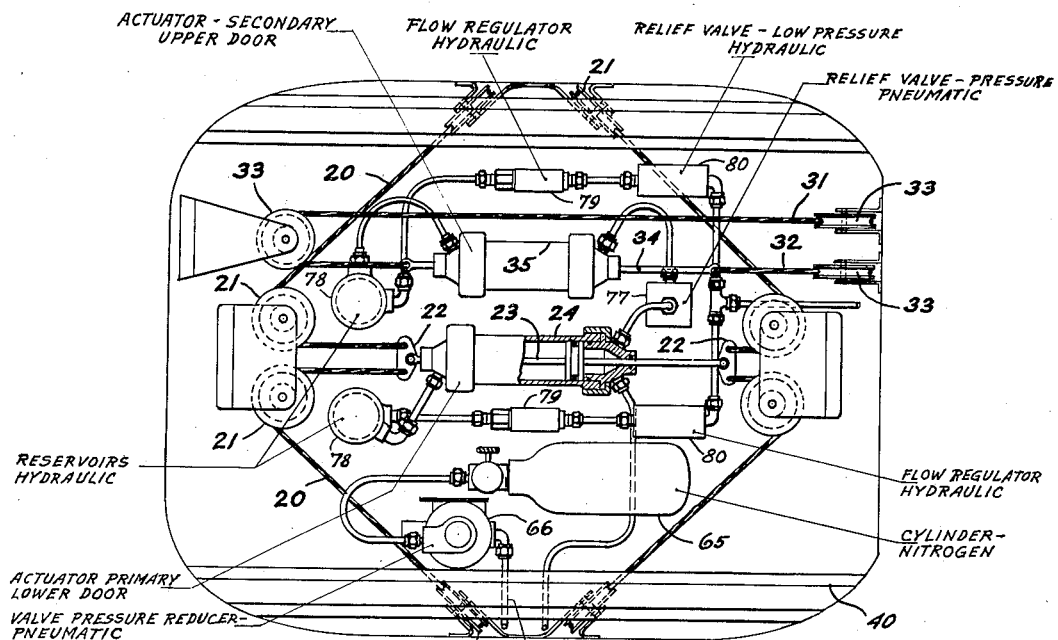
Fig. 5
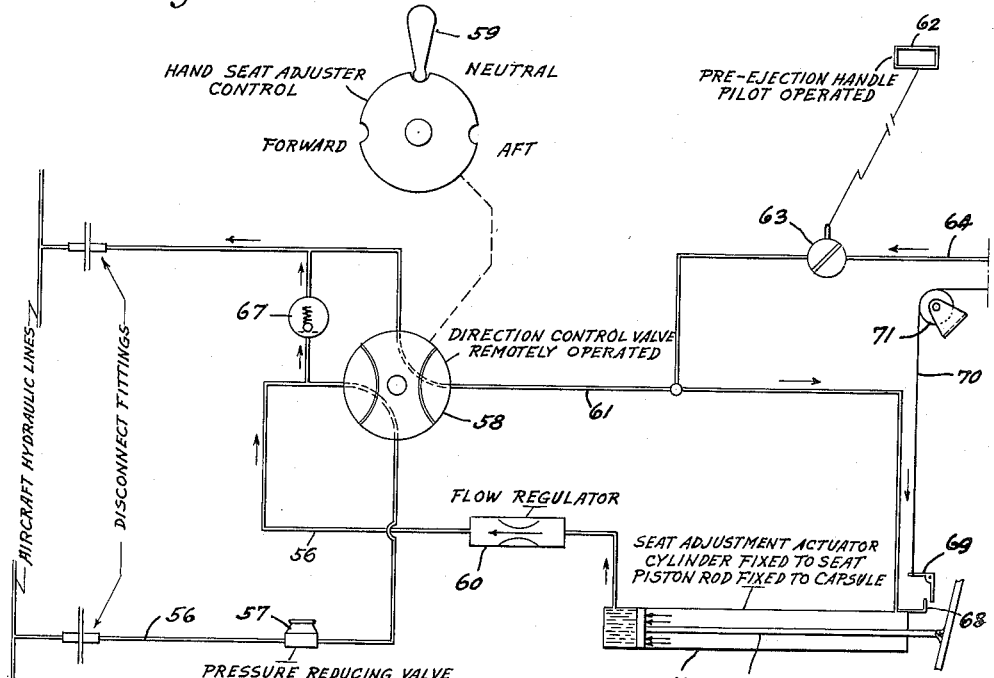
Fig. 6a  HORIZONTAL SEAT ADJUSTMENT MECHANISM (EJECTION CONDITION)
INVENTOR.
Doane R. Gero
BY
ATTORNEY Jan. 31, 1956  D. R. GERO  2,733,027
EJECTABLE AIRCRAFT SEAT CAPSULE
Filed Dec. 17, 1952  5 Sheets-Sheet 5
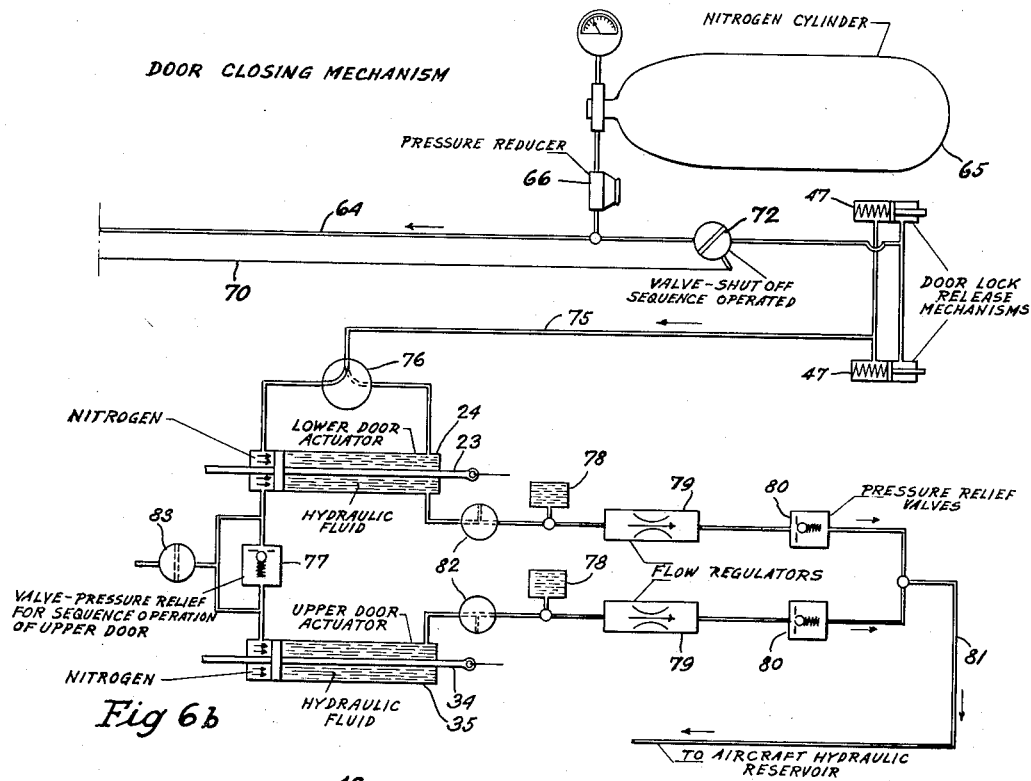
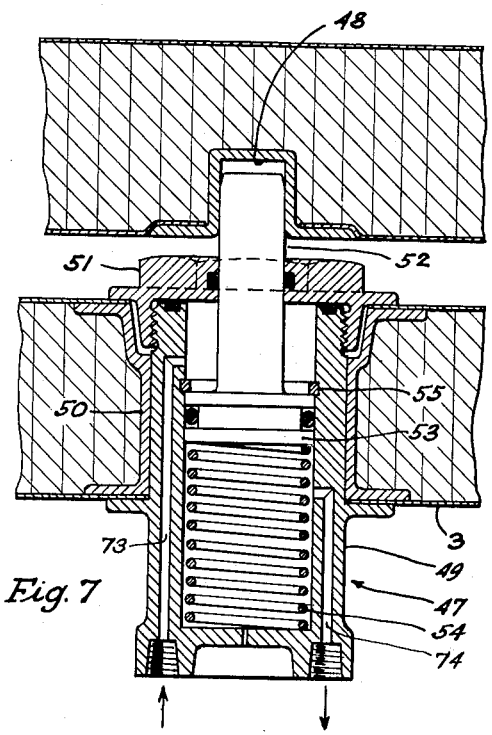
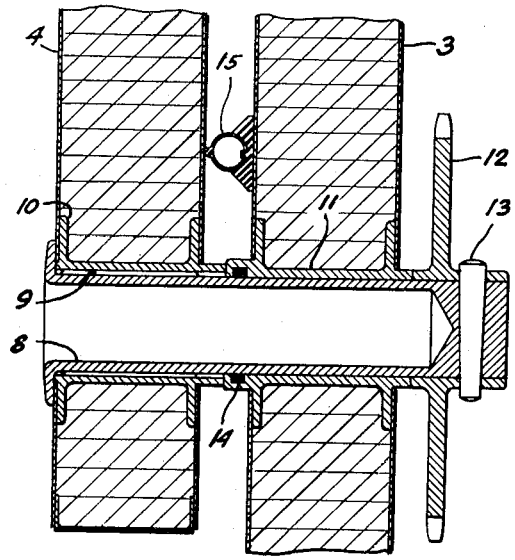
INVENTOR.
Doane R. Gero
BY
*A. H. Oldham*
ATTORNEY

United States Patent Office 2,733,027
Patented Jan. 31, 1956

2,733,027

EJECTABLE AIRCRAFT SEAT CAPSULE

Doane R. Gero, Akron, Ohio, assignor to Goodyear Aircraft Corporation, Akron, Ohio, a corporation of Delaware Application December 17, 1952, Serial No. 326,473

4 Claims. (Cl. 244—140)

This invention relates to ejection seats for occupants of a high speed airplane and in particular to a capsule or enclosure for such seats to provide a means for protecting the occupant to safely escape from the airplane in flight.

Heretofore it has been known to provide an ejection seat for the pilot of high speed airplanes from which the seat can be readily ejected to save the pilot's life. However, it has been found that when an aircraft travels at near or supersonic speed ejection of an occupant in an open seat is no more safe because of his exposure to severe wind blast at such speed and to the low temperature at high altitude.

It is the general object of the invention to avoid and overcome the foregoing and other difficulties of and objections to prior art practices by providing the occupant of an airplane ejection seat with an enclosure or capsule having doors to be closed and made airtight prior to ejection.

Another object of the invention is to save a seat occupant by very simple movements who otherwise may not be able to perform voluntarily more complex types of escape functions.

Another object of the invention is to make the capsule floatable when landing on water.

Another object of the invention is to make the capsule adapted for pressurization.

The aforesaid objects of the invention, and other objects which will become apparent as the description proceeds, are achieved by placing the ejection seat and its occupant within a capsule provided at front with a pair of doors, an upper and a lower one, each rotatable about a horizontal axis and sealed against each other in closed condition as well as against the capsule body to completely protect the occupant at an ejection against external hazardous conditions and to make it floatable when landing on water. All capsule operations are automatic and can be initiated from a single lever or switch. This is to insure safe escape of an occupant who is wounded and who could not perform in an open ejection seat the normal escape functions. During normal operations of an airplane the capsule doors are open so that the occupant can operate the airplane in the usual manner. The capsule includes standard equipment of an armor plate, an adjustable seat parachute for the occupant, a recovery drogue chute, oxygen for occupant and accompanying disconnect units, ejection gun, ejection track and support structure all of which are essentially the same as for an open ejection seat and are not a part of the invention.

For a better understanding of the invention reference should be had to the accompanying drawings, wherein Fig. 1 is a vertical cross-sectional side view taken on line I—I of Fig. 4 of one embodiment of the invention, showing the capsule in closed condition for ejection from an airplane.

Fig. 5 is a plan view of the pneumatic-hydraulic door operating system located underneath the capsule floor.

Figs. 6a and 6b are schematic views of the pneumatic-hydraulic mechanism for horizontal seat adjustment and door operation.

Fig. 7 is a cross sectional vertical view of the door lock, and

Fig. 8 is a cross sectional view of the pivotal mounting of the doors on the capsule body.

Figure 1:
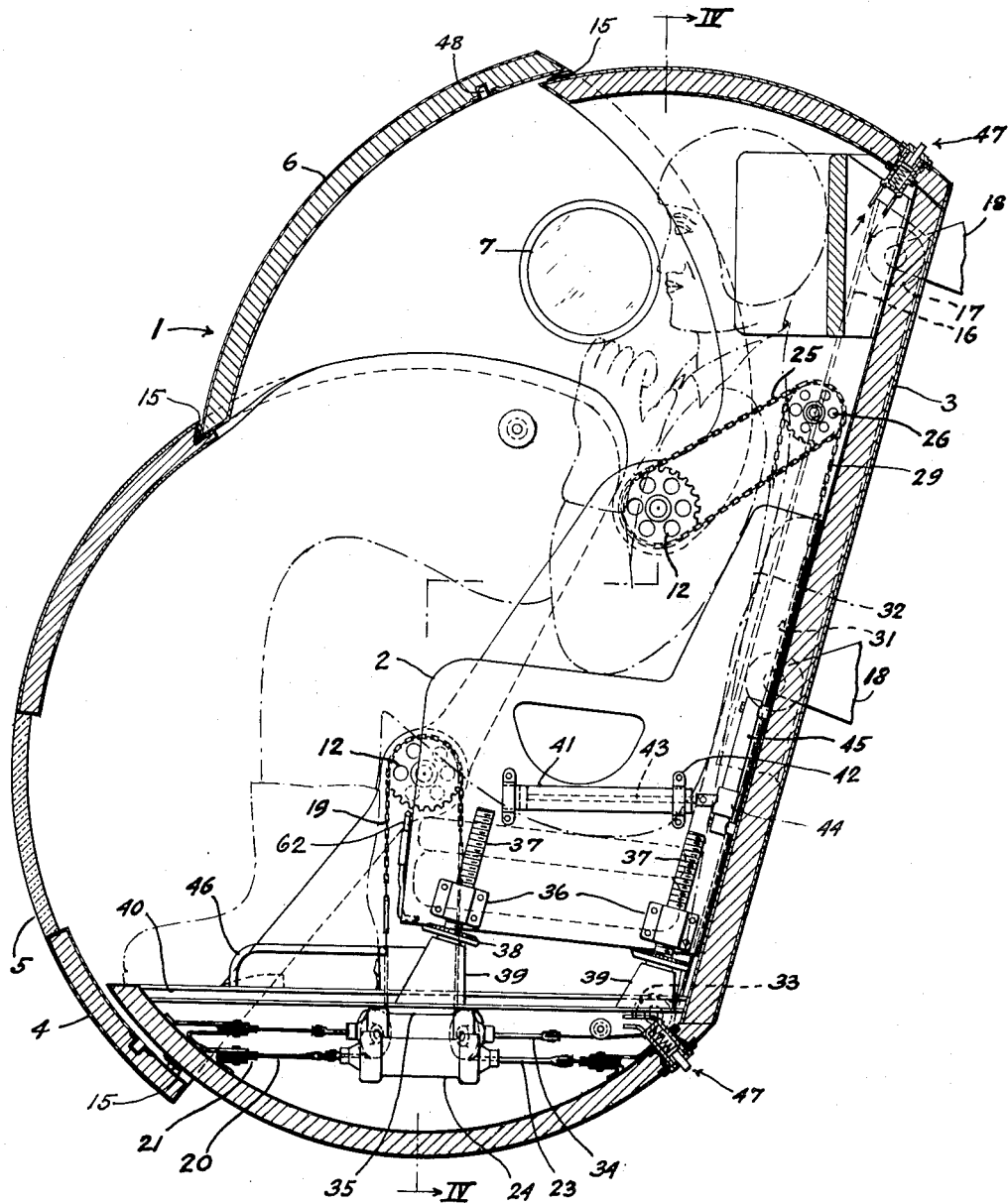

With specific reference to the form of the invention illustrated in the drawings the numeral 1 indicates in general an enclosure or capsule usually positioned in the cockpit of the airplane, having walls preferably made of laminated metal structure consisting of outer face sheets enclosing a honeycomb core to afford light weight combined with great strength and rigidity. A horizontally and vertically adjustable seat 2 for the pilot or other occupant is mounted in the capsule. The capsule comprises a body 3 having a substantially flat back wall, flat side walls and cylindrically shaped top and bottom walls, which form with the side walls corners of large radii, a lower door 4 provided with a window 5, and an upper door 6 provided with windows 7. Flanged pivots 8, having splines 9 in engagement with corresponding splines in the fittings 10 fixed in the doors, are supported by bearings 11 inserted in the side walls of body 3 and carry sprockets 12 fixed to the inner ends of the pivots 8 by pins 13 or by other means. An O-ring 14 inserted in a groove in the bearing 11 serves as an airtight seal. The doors 4 and 6 when open, telescope, respectively, over the lower and upper body portions and are uniformly spaced from the walls of the body 3 to provide space for sealing strips 15 attached along edge portions of the body 3. Such sealing strips are also attached to one of the doors where their edges abut in closed condition. Advantageously, sealing strips of the inflatable type are used which in uninflated condition provide sufficient clearance for easy door movement. At the corners, formed by the back wall and side walls of body 3, are provided capsule ejection rails 16 riding on rollers 17 pivotally mounted on brackets 18 fixed to the airplane structure (not shown).

Each door is actuated by an endless sprocket chain and cable system operated by a gas-hydraulic pressure cylinder, and most parts of which are installed underneath the capsule floor and independent of power outside the capsule. At each side of the lower door 4 a chain 19 engaging the sprocket 12 has attached to its end cables 20 running over pulleys 21, whereas, the other ends of the cables are attached to balancing levers 22 pivotally connected to each end of the piston rod 23 extending over both ends of the gas-hydraulic pressure cylinder 24, thus forming an endless traction system for closing and opening the lower door 4. Similarly operated is the upper door 6. At both sides of this door an endless chain 25 runs over the door sprocket 12 and over a sprocket 26 mounted on a transverse transmission shaft 27 supported by bearings 28 inserted in the side walls of body 3. A chain 29 leading over sprocket 30 at one side of shaft 27 has attached to its ends cables 31 and 32 which lead over pulleys 33, with the end of one of the cables being attached to one end of the piston rod 34 extending over both ends of the gas-hydraulic operated piston 35 and the end of the other cable is attached to the other end of the piston rod 34, thus also providing an endless traction system for closing and opening the upper door.

Figure 2:
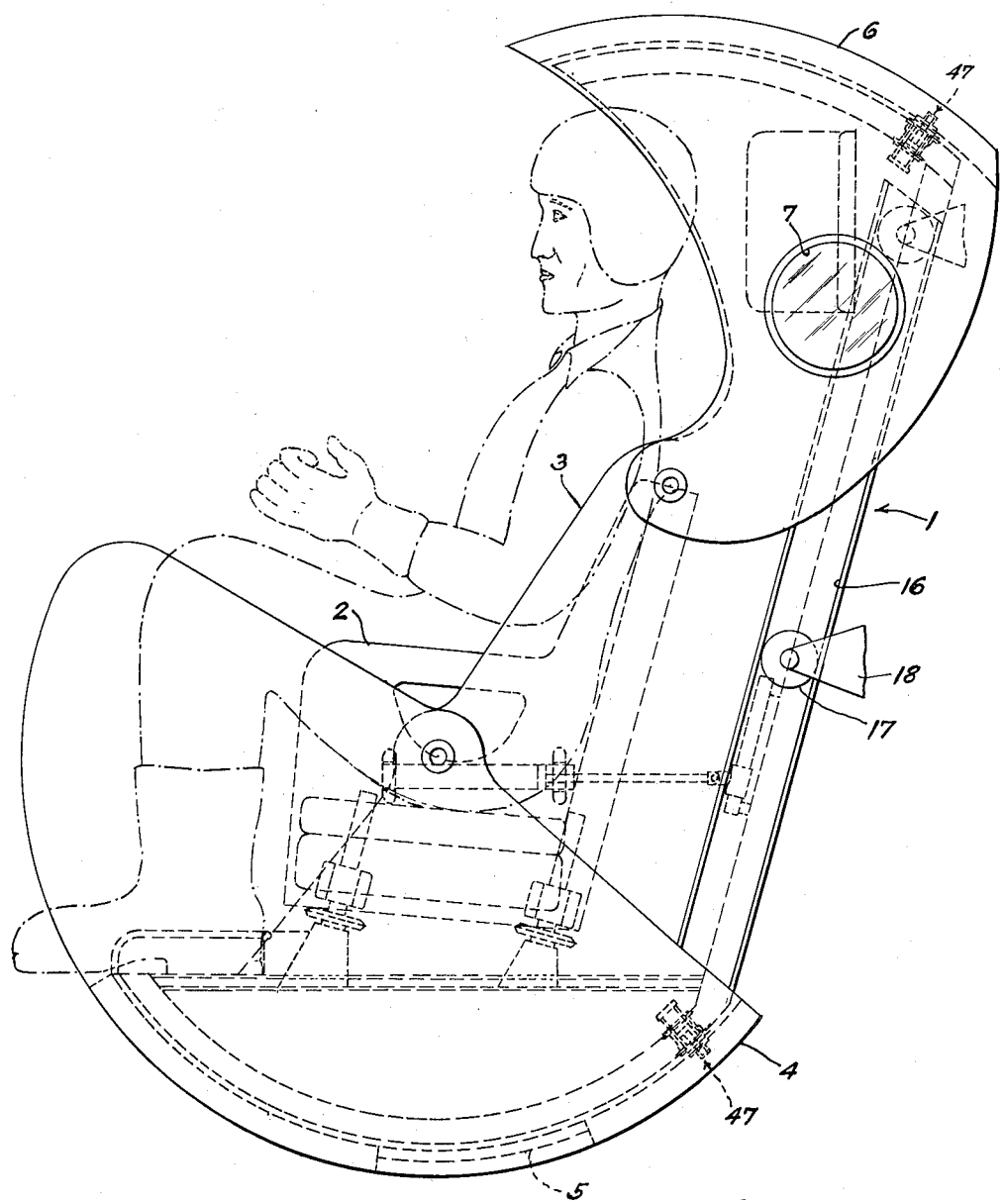
Fig. 2 is a vertical side view of the capsule in open condition during normal operation of the airplane.
Figure 3:
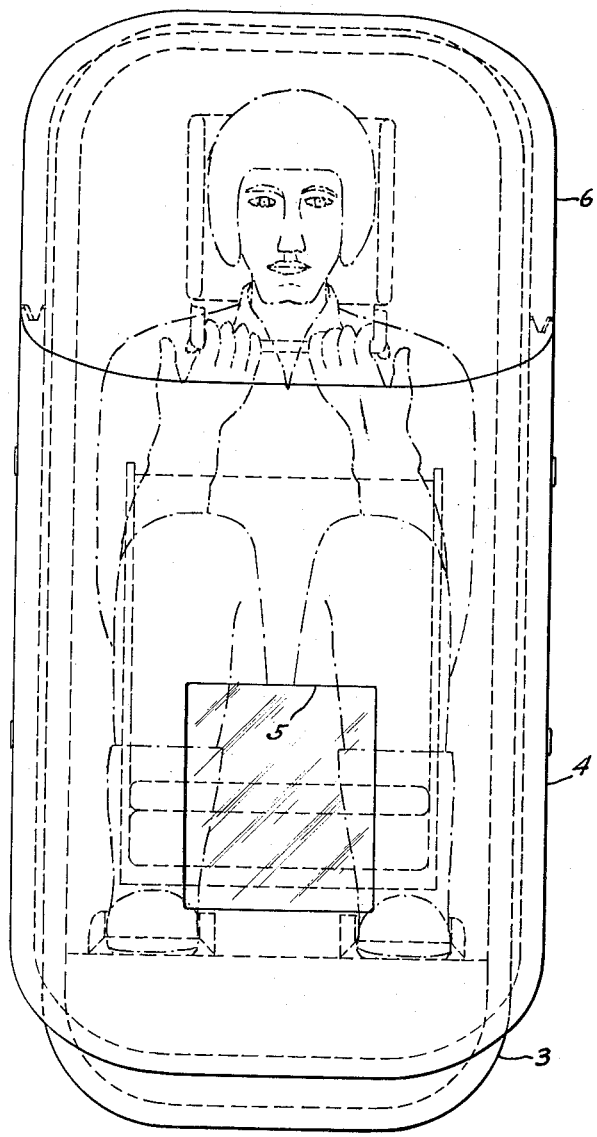
Fig. 3 is a front view.
Figure 4:
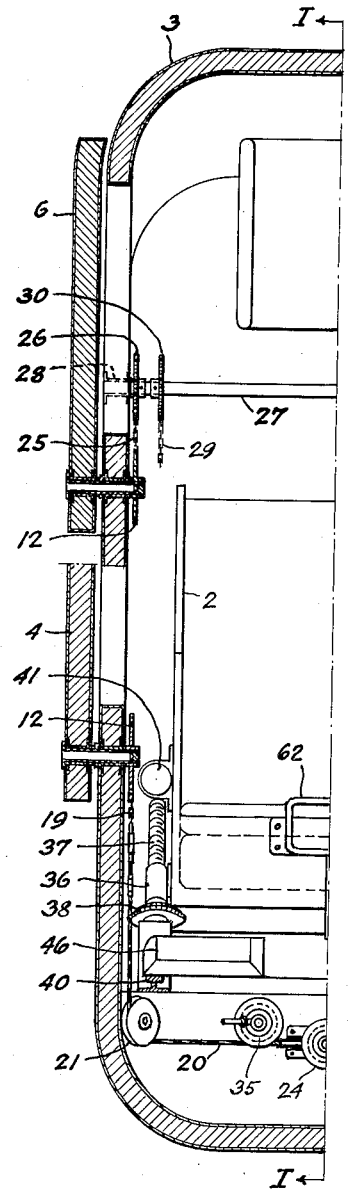
Fig. 4 is a half vertical cross-sectional view taken on line IV—IV of Fig. 1.

The seat 2, provided with side brackets 36, is mounted for vertical adjustment on spindles 37 threaded into the brackets 36 and turnable by bevel gears 38 in supports 39 which are slidable on guide rails 40 placed at capsule floor level. To raise and lower the seat 2 the bevel gears are driven by a motor drive (not shown) installed underneath the seat bottom and receiving its power from the airplane. For horizontal adjustment, a pair of hydraulic pressure cylinders 41 are attached by brackets 42 to the seat with the cylinder piston rod 43 pivotally connected to a sleeve 44 slidable on a substantially vertical guide 45 which are fixed to the back wall of the capsule. A pair of shoes 46 for positioning the feet of the seat occupant are fixed to the front seat supports 39. In Fig. 2 the capsule 1 is shown with the doors 4 and 6 open and with the seat 2 in its most forward position so that the side vision of the occupant is not obstructed by the capsule side walls. In this seat position the feet of the occupant extend beyond the capsule wall. To fix the doors in open position to body 3, each door is locked by a separate lock mechanism 47, designated as a whole, which is mounted in the top and bottom walls of the body 3 and which engages a socket 48 as shown in detail in Fig. 7. The lock mechanism 47 consists of a pressure cylinder 49, inserted in wall fitting 50 and locked into place by a nut 51 sealed by packing rings against the cylinder end and against the lock pin 52 extending from the cylinder piston 53 which is forced in locking position by a spring 54 against the retaining ring 55.

For holding seat 2 during flight in extended position, the seat actuating cylinders 41, as shown in Fig. 6a, are supplied with pressure from an aircraft hydraulic pressure line through conduits 56 which contain a pressure reducing valve 57 for approximately 100 p. s. i. delivery pressure, a directional control valve 58, set as shown in dotted lines, and manually operated from a remote control 59, and a flow regulator 60.

In preparing the capsule for ejection, seat 2 must be retracted for closing the doors. This is accomplished by first putting valve 58 into neutral position to cut off conduit 61 leading to the gas side of cylinder 41. By pulling the pre-ejection handle 62, located in front of the seat, the shut-off valve 63 in conduit 64 is opened to admit from the pressure cylinder 65, Fig. 6b, holding gas at, for instance, 3000 p. s. i., through a reduction valve 66 set for 1000 p. s. i. to the seat cylinders 41 which moves backwards, whereby the hydraulic liquid in the cylinders is pushed through the relief valve 67 back to the aircraft oil reservoir. The trigger 68 extending from cylinder 41 turns the lever 69 and pulls the cable 70 leading over pulley 71 to open shut-off gas valve 72 to admit the gas through the inlet 73 of cylinder 49, thereby releasing the lock pin 52 from the socket 48. By such release the piston 53 frees the gas outlet 74 of cylinder 49 to let the gas flow through conduit 75 and directional flow valve 76 into the lower door actuating cylinder 24 and through relief valve 77 also into the upper door actuating cylinder 35. The oil contained in the cylinder at the opposite side of the pistons and in communication with oil reservoirs 78, to avoid shock of the door closure, is forced through hydraulic flow regulators 79 and pressure relief valve 80 into conduit 81 back to aircraft hydraulic reservoir.

For the purpose of opening the doors and to leave the capsule after it has been rejected by the known ejection seat method from the aircraft and landed, either on land or water, three-way valves 82 are pivoted to shut off the hydraulic fluid expelling lines of the cylinders 24 and 35, and a release valve 83 provides to release the pressure in the gas side of these cylinders. However, before releasing this pressure, the directional flow valve 76 is set neutral to prevent escape of the gas from the system through valve 83. After such setting, valve 76 is opened, as shown in dotted lines, to admit the gas into the originally hydraulic side of the cylinders 24 and 35 to open both doors simultaneously.

From the above description it will be understood that the invention is a great improvement over open air ejection seats and fully meets the objects of protecting an aircraft pilot or other crew members against hazards when ejected from an aircraft travelling at near or supersonic speeds and also is capable of landing more safely on solid ground or on water, since the capsule is floatable. Because the capsule is completely airtight it can be pressurized to avoid sudden harmful pressure differences between airplane and atmospheric air.

While certain representative embodiments and details have been shown for the purpose of illustrating the invention, it will be apparent to those skilled in this art that various changes and modifications may be made therein without departing from the spirit or scope of the invention.

What is claimed:

1. For an airplane an ejectable protective capsule containing an adjustable seat for a pilot or crew member, said capsule comprising a one-piece shell completely open at front, launching rails attached to the shell, a lower and an upper door for completely closing the shell, each of said doors being pivotally mounted on the shell and swingable about a transverse axis, gas power means located within said capsule for operating said doors, said power means including a storage cylinder containing high pressure gas, a valve for reducing gas storage pressure to operating pressure, gas-operated hydraulic actuating cylinders for shifting said seat horizontally from normal flying position to ejection position, gas pressure piston operated lock pin mechanism for locking said doors in open position, a separate gas-operated hydraulic cylinder including a piston and piston rod acting upon each door, the piston rod extending beyond both ends of the cylinder, an endless sprocket chain and cable system attached to the ends of each piston rod and in operative engagement with a respective door for pivotal movement thereof, a pressure conduit system, including valves, supplied with gas at reduced pressure from said gas storage cylinder and being connected to all of said actuating cylinders and to said lock mechanisms, one of said valves, manually operated, admitting gas to said seat actuating cylinders, a trigger attached to one of said seat actuating cylinders in association with means for opening one of said valves to admit pressure into said lock pin mechanisms for releasing the lock pins and thereby admitting pressure to both door actuating cylinders, and means for cotrolling the piston movement in these cylinders.

2. For an airplane an ejectable protective capsule containing an adjustable seat for a pilot or crew member, according to claim 1, provided with ducts and shut off valves for changing the power gas inlet to said door actuating cylinders from one end to the other to open the doors after the capsule has landed on the ground or on water.

3. For an airplane an ejectable protective capsule containing an adjustable seat for a pilot or crew member, said capsule comprising a one-piece shell completely open at front, doors swingable about transverse axes for closing the shell, locking means for securing the doors in open position, means for moving said seat from normal flying position to ejection position to subsequently release said door locking means, and actuating means within the shell controlled by said door locking means for closing the doors.

4. For an airplane an ejectable protective capsule containing an adjustable seat for a pilot or crew member, according to claim 3, containing means for opening the doors by said door actuating means.

References Cited in the file of this patent

FOREIGN PATENTS

| | | |
|---|---|---|
| 399,332 | Great Britain | Oct. 5, 1933 |
| 474,862 | Great Britain | Nov. 9, 1937 |
| 580,446 | Great Britain | Sept. 9, 1946 |